United States Patent [19]

Younger

[11] 4,215,875
[45] Aug. 5, 1980

[54] TRAILER HITCH

[76] Inventor: Dwen R. Younger, 2181 Lone Oak Ave., Napa, Calif. 94558

[21] Appl. No.: 956,154

[22] Filed: Oct. 31, 1978

[51] Int. Cl.² ............................................. B60D 1/16
[52] U.S. Cl. ................................................ 280/478 B
[58] Field of Search ............... 280/477, 478 R, 478 A, 280/478 B

[56] References Cited

U.S. PATENT DOCUMENTS

| | | | |
|---|---|---|---|
| 2,844,390 | 7/1958 | Smith | 280/477 |
| 2,973,971 | 3/1961 | Oddson | 280/478 B |
| 3,099,462 | 7/1963 | Lent | 280/478 B |
| 3,612,576 | 10/1971 | Marler | 280/478 B |
| 3,643,976 | 2/1972 | Haupt | 280/478 R |
| 3,807,768 | 4/1974 | Jones | 280/478 B |

Primary Examiner—John J. Love
Assistant Examiner—Randall A. Schrecengost

[57] ABSTRACT

An improved trailer hitch for automatically aligning and coupling a trailer to a towing vehicle. A movable coupler has a forward portion comprising a conventional socket and latching device for attachment to a ball on the towing vehicle and a rearward portion comprising vertically oriented rearwardly converging side walls. The rearward portion is configured to mate with an opening in the trailer front end so that the side walls abut vertically oriented forwardly diverging guide plates in the trailer front end. The side walls have a vertical thickness along a portion of their length substantially less than the vertical thickness of the guide plates so that the coupler may be raised vertically while in the opening to facilitate attachment of the socket on the coupler to the ball on the towing vehicle. Means are provided for automatically locking the coupler to the trailer when the side walls of the coupler are in abutment with the guide plates in the trailer front end.

6 Claims, 3 Drawing Figures

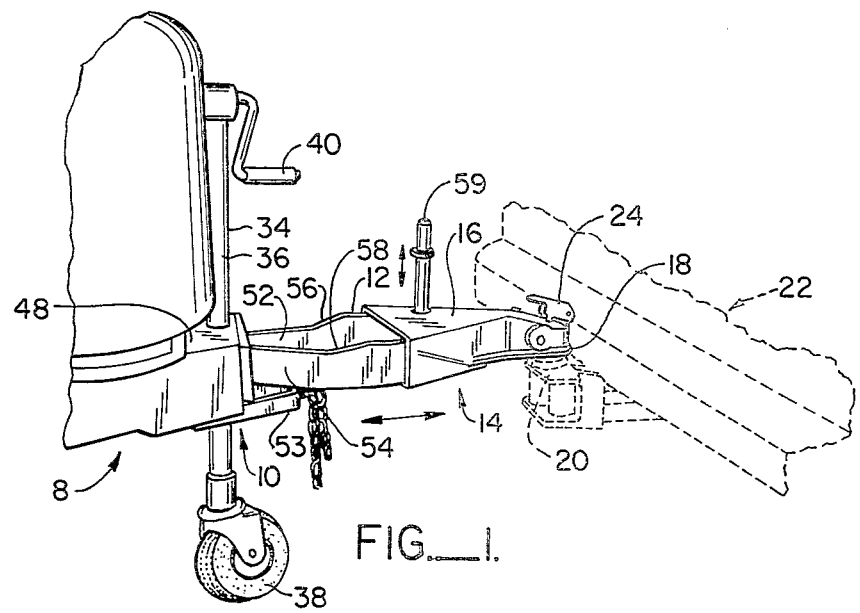
FIG.__1.
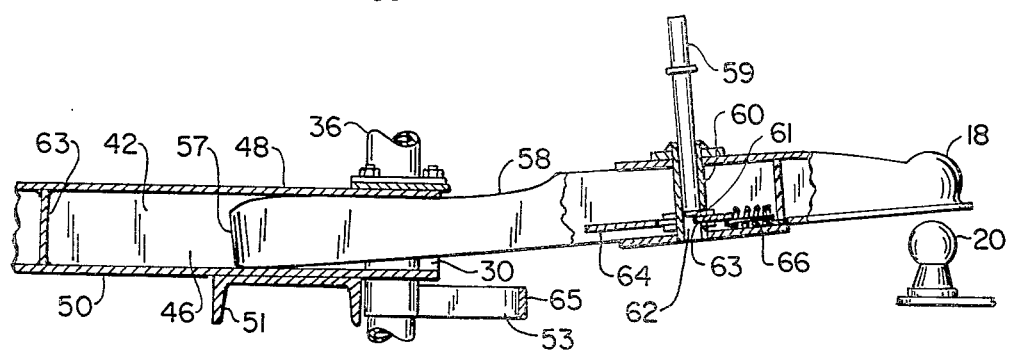
FIG.__2.
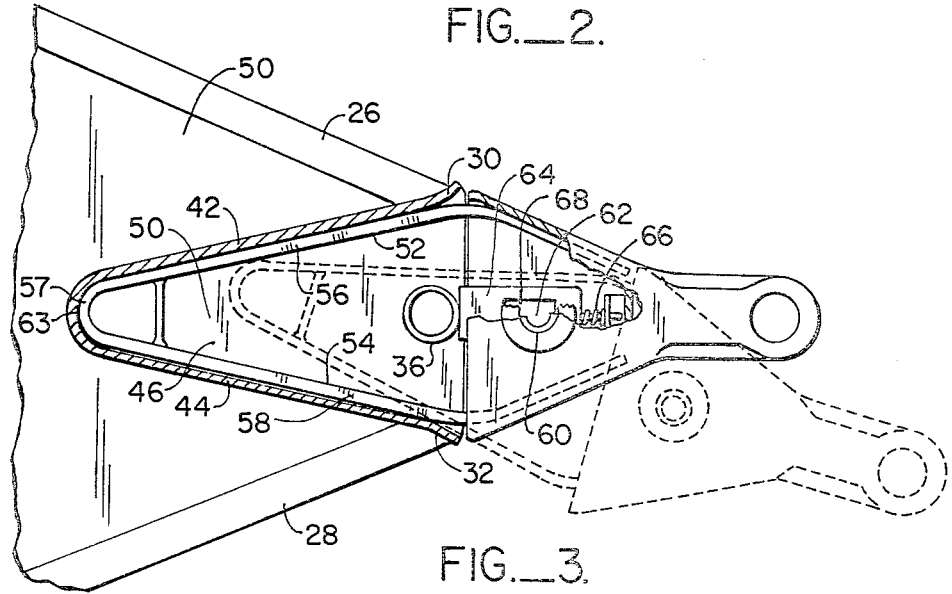
FIG.__3.

TRAILER HITCH

BACKGROUND OF THE INVENTION

This invention relates to a hitch for attaching a trailer to a towing vehicle and more specifically, to an improved trailer hitch which allows for automatic aligning and coupling of the trailer to the towing vehicle.

Trailer hitches which permit alignment of the trailer with the towing vehicle comprise generally a movable coupler having a rearward portion loosely connected to the forward end of the trailer and a forward portion having a socket for engagement with a ball on the towing vehicle. The forward end of the trailer has spaced-apart vertically-oriented guide plates which converge rearwardly toward a slot. The rearward portion of the coupler has an arm with a wheel rotatable about a vertical axis mounted to its end. As the forward portion of the movable coupler, which is attached to the towing vehicle, is moved in a horizontal plane through an angle by the rearward movement of the towing vehicle, the wheel connected to the rearward portion of the coupler contacts respective guide plates and rides along the rearwardly converging guide plates until the wheel is seated within the slot in the trailer, thereby providing alignment of the trailer with the towing vehicle. The movable coupler is then securely connected to the trailer by a manually-operated locking device.

Trailer hitches of the above-described configuration possess inherent disadvantages. They are generally incapable of vertical movement which is necessary to facilitate connection of the socket on the coupler with the ball on the towing vehicle. Accordingly, one must use the jack on the forward end of the trailer to raise the trailer and permit the socket of the coupler to be attached to the ball on the towing vehicle. Additionally, because the wheel seated within the slot provides a single point of connection of the coupler to the trailer, lateral stresses are concentrated at this single point connection during turns and other maneuvers. Also, because the arm with the attached wheel does not conform to the shape of the rearwardly converging guide plates, extreme angular deviations of the forward end of the coupler are possible when the towing vehicle is backed up in the process of coupling, even to the extent where the arm may approach a guide plate at a right angle, thus requiring a large force to align the trailer with the towing vehicle.

U.S. Pat. Nos. 3,612,576 and 2,973,971 are directed to the above-described trailer hitches.

SUMMARY OF THE INVENTION

Broadly, the invention comprises a pair of vertically-oriented guide plates on the front end of the trailer which define an outwardly diverging V-shaped slot, a movable coupler having a conventional forward portion and a generally V-shaped rearward portion configured to mate with the guide plates on the front end of the trailer, and an automatic locking mechanism responsive to insertion of the rearward portion of the coupler into the slot on the front end of the trailer.

The rearward portion of the coupler has vertical sidewalls having a depression along at least a portion of their length which allows for vertical movement of the forward portion of the coupler when the rearward portion of the coupler is loosely retained within the slot on the trailer.

The means for automatically locking the coupler to the trailer comprises generally a vertically-oriented bushing defining a bore through the coupler, a horizontal spring-restrained plate intersecting at least a portion of the bushing so as to block the bore, a locking pin within the bore and supported above the spring-restrained plate, and a locking pin receiving means rigidly secured to the trailer.

In operation, the towing vehicle is backed toward the trailer until the ball on the towing vehicle is in generally close proximity to the socket on the forward portion of the movable coupler. The coupler, which is loosely retained within the slot on the trailer is pulled forward and moved through an angle in the horizontal plane until the forward portion of the coupler is generally aligned with the ball on the towing vehicle. The forward portion of the coupler is raised vertically, and the socket is placed over the ball and secured to the ball in the conventional manner. The towing vehicle is then backed up. The V-shaped rearward portion of the coupler engages the forwardly diverging guide plates on the front end of the trailer and the coupler moves into the slot. When the vertical sidewalls of the rearward portion of the coupler are in mutual abutment with respective guide plates so that further movement of the coupler towards the trailer is not possible, the spring-restrained plate contacts part of the trailer and is moved out of intersection with the bore. The locking pin supported in the bore above the plate falls through the bore and into the locking pin receiving means on the trailer, thereby rigidly securing the coupler to the trailer.

For a fuller understanding of the nature and advantages of the invention, reference should be made to the ensuing detailed description taken in conjunction with the accompanying drawings.

BRIEF DESCRIPTION OF THE DRAWINGS

FIG. 1 is a view of the movable coupler in relationship with the front end of a trailer and the rear end of a towing vehicle.

FIG. 2 is a partial section of a side view of the movable coupler in position prior to attachment to the towing vehicle.

FIG. 3 is a top view in partial section of the movable coupler securely coupled to the front end of the trailer.

DESCRIPTION OF THE PREFERRED EMBODIMENTS

Referring to FIG. 1, a conventional trailer 8 having a modified front end 10 is shown loosely connected to the rearward portion 12 of the movable coupler 14.

Coupler 14 has a forward portion 16 having a socket 18 for attachment to a ball 20 on the rear of the towing vehicle 22. The ball 20 and socket 18 are parts of a conventional mechanism for attaching a trailer to a towing vehicle. A latching device 24 located on forward portion 16 of coupler 14 proximate socket 18 allows coupler 14 to be securely attached to towing vehicle 22 in the conventional manner.

The front end 10 of trailer 8 has been modified in the manner depicted in FIGS. 2 and 3. The forward end of a conventional trailer, which typically includes a socket and latching device, such as that shown on the movable coupler in FIG. 1, has been removed, leaving trailer frame brackets 26, 28 (FIG. 3) sectioned off at respective ends 30, 32. A conventional trailer jack 34 compromising generally a central shaft 36 connected at one end to a trailer support wheel 38 and at the other end to handle 40 remains aft of ends 30, 32 of frame brackets 26, 28. A pair of vertically oriented guide plates 42, 44 are secured, e.g. welded, to respective frame bracket ends 30, 32 and are oriented so that they converge rearwardly, thereby defining a generally V-shaped slot or opening 46 in the front end 10 of trailer 8. As depicted in FIG. 3, guide plates 42, 44 may be constructed of a single plate bent generally in the middle. Located above and below guide plates 42, 44 are a horizontally oriented upper plate 48 (FIG. 2) and a horizontally oriented lower plate 50, the latter being secured above transverse frame member 51 (FIG. 2). Vertically oriented shaft 36 of trailer jack 34 passes through upper plate 48 and lower plate 50 and is rigidly secured thereto. A locking pin receiving means, the function of which will be more fully described below, comprises a bracket 53 secured to the front end 10 below V-shaped opening 46 and forward of transverse frame member 51. The modified front end 10 of trailer 8 cooperates with movable coupler 14 to automatically align trailer 8 with towing vehicle 22 in the manner more fully described below.

Referring to FIGS. 2 and 3, movable coupler 14 comprises generally a rearward portion 12 configured for insertion into the V-shaped opening 46 on front end 10 and for mating with guide plates 42, 44, a forward portion 16 having a socket 18 for attachment to the ball 20 on the towing vehicle 22, and means between the forward and rearward portions for locking coupler 14 securely to front end 10, said locking means including locking pin 59.

Rearward portion 12 of coupler 14 has vertically oriented rearwardly converging sidewalls 52, 54. Sidewalls 52, 54 have a vertical thickness over the major portion of their length which is only slightly less than the vertical thickness of the slot on the front end 10 of trailer 8, that is, the vertical thickness defined by upper plate 48 and lower plate 50. Along a segment of the length of each vertical sidewall 52, 54 is a depression, generally depicted as 56,58 respectively, which define a portion of respective side walls 52, 54 having a vertical thickness substantially less than the vertical thickness of the V-shaped opening 46 on front end 10.

Located in coupler 14 between the rearward most extent 57 of converging sidewalls 52, 54 and socket 18 on forward portion 16 is a vertically oriented bushing 60 defining a bore 62 through coupler 14. Bushing 60 has a notch 61 in a portion of its wall. As depicted in FIG. 2, the distance between the rearward most extent 57 of coupler 14 and bushing 60 is generally equal to the distance between the rearward most extent 63 of V-shaped opening 46 on front end 10 and the forward most extent 65 of the locking pin receiving means, i.e. bracket 53.

Located within coupler 14 and oriented generally transverse to bushing 60 is a movable plate 64 operatively connected to a compressive spring 66. Plate 64 has an opening 68 having a portion of its periphery defined by straight edge 63. Opening 68 surrounds bushing 60 and edge 63 is adapted for insertion into notch 61 in bushing 60. Thus, when spring 66 is fully extended (FIG. 2), edge 63 of plate 64 resides within notch 61 of bushing 60, thereby blocking bore 62. When spring 66 is compressed (FIG. 3), edge 63 on plate 64 is moved out of notch 61 of bushing 60, thereby removing any obstruction within bore 62. Bushing 60 having notch 61, plate 64 having opening 68 and edge 63, spring 66, locking pin 59 (FIG. 2), and bracket 53 provide means for locking movable coupler 14 to front end 10 when rearward portion 12 is fully inserted in opening 46.

The operation of movable coupler 14 to automatically align and secure trailer 8 to towing vehicle 22 will be better understood by referring to FIGS. 2 and 3 and considering the function of the above-described component parts. The towing vehicle 22 is first backed up so as to be in the general vicinity of socket 18 on movable coupler 14. Prior to coupling, coupler 14 is fully inserted within opening 46 so that sidewalls 52, 54 are in abutment with respective guide plates 42, 44. Plate 64 is in contact with shaft 36 so that spring 66 is compressed and plate 64 is out of engagement with notch 61 in bushing 60, thereby permitting locking pin 59 to be fully inserted in bore 62 and in locking engagement with bracket 53 on trailer front end 10. In order to unlock coupler 14 from front end 10, locking pin 59 is pulled slightly out of bore 62 to a point just above notch 61, which allows spring 66 to extend. Because plate 64 is contacting shaft 36, the extension of spring 66 forces coupler 14 away from trailer front end 10. When coupler 14 is thus moved slightly away from front end 10 so that sidewalls 52, 54 no longer abut respective guide plates 42, 44, edge 63 of plate 64 is allowed to move into notch 61 in bushing 60. Locking pin 59 is now released and supported in bore 62 above plate 64.

Movable coupler 14 is now unlocked and may be moved forward, as depicted in FIG. 2, toward ball 20 of the towing vehicle. Movable coupler 14 is raised vertically as depicted in FIG. 2 so that socket 18 may be placed over ball 20 on trailer 22. Vertical movement of coupler 14 is facilitated by depressions 56, 58 in respective sidewalls 52, 54. It should be apparent that towing vehicle 22 need not be perfectly aligned with trailer 8 since coupler 14, because of rearwardly converging sidewalls 52, 54, may be moved in a horizontal plane to either side so as to align socket 18 with ball 20. This provision for lateral movement of coupler 14 is depicted by the dotted lines in FIG. 3. The forward portion 16 is lowered so that socket 18 is placed over ball 20 and conventional latching device 24 is secured, thereby securely attaching ball 20 to socket 18.

The towing vehicle 22 is backed up, moving coupler 14 rearward and causing sidewalls 52, 54 to contact guide plates 42, 44 in trailer front end 10. As coupler 14 continues to move rearwardly, forces are applied to guide plates 42, 44 by sidewalls 52, 54 which tend to rotate trailer 8 so that guide plates 42, 44 become aligned with sidewalls 52, 54. Coupler 14 continues to move rearwardly and trailer 8 continues to rotate until sidewalls 52, 54 and guide plates 42, 44 are generally in abutment, as depicted in FIG. 3.

As sidewalls 52, 54 approach respective guide plates 42, 44, plate 64 contacts shaft 36 of trailer jack 34, thereby compressing spring 66 and moving edge 63 on plate 64 out of intersection with notch 61 in bushing 60. When sidewalls 52, 54 are in abutment with guide plates 42, 44 respectively, edge 63 on plate 64 has been moved completely out of notch 61, thereby permitting locking pin 59 to fall through bore 62 and through the locking pin receiving means, i.e. bracket 53 secured to trailer front end 10 below V-shaped opening 46. At this point, movable coupler 14 is in secure engagement with trailer 8 and locked thereto by locking pin 59, thereby permitting trailer 8 to be towed by vehicle 22. It should be noted that portions of sidewalls 52, 54 just forward and rearward of depressions 56, 58 have a vertical thickness generally equal to the vertical thickness of guide plates 42, 44 so that coupler 14 is now restrained from vertical movement within V-shaped opening 46.

As is now apparent, the present invention provides automatic aligning and securing of a trailer to a towing vehicle. The provision of rearwardly converging side walls having a thickness along a portion of their length substantially less than the thickness of the forwardly diverging guide plates allows for vertical movement of the movable coupler, thereby facilitating attachment to the towing vehicle. Additionally, the large area of contact provided by side walls on the coupler abutting guide plates on the trailer makes for secure connection, especially during turns and other maneuvers which subject the coupler-trailer connection to lateral stresses. Also because the rearward portion of the coupler conforms to the shape of the opening in the trailer front end, large angular deviations of the forward end of the coupler are prevented when the towing vehicle is backed up during coupling.

While the preferred embodiment of the present invention has been illustrated in detail, it should be apparent that modifications and adaptations to that embodiment will occur to those skilled in the art. However, it is to be expressly understood that such modifications and adaptations are within the sphere and scope of the present invention as set forth in the following claims.

What is claimed is:

1. An apparatus for attaching a trailer to a towing vehicle which comprises:
    means on the front end of the trailer defining a horizontally-oriented forwardly diverging slot of a first vertical thickness;
    means for coupling the trailer to the towing vehicle, said coupling means having a bore therethrough, a rearward portion configured for insertion into said slot and for mating with said means defining said forwardly diverging slot, and a forward portion for attachment to the towing vehicle;
    a segment of the rearwardly extending portion of said coupling means having a second vertical thickness substantially less than the first vertical thickness of said slot so that said coupling means can be moved vertically within said slot to facilitate attachment of the forward portion of said coupling means with the towing vehicle;
    means for interlocking said coupling means and the trailer when said rearward portion of said coupling means is inserted into said slot, said interlocking means having a locking pin insertable through said bore; and
    means on the trailer for receiving said locking pin when the rearwardly convering portion of said coupling means is inserted into said slot.

2. An apparatus according to claim 1 including means operatively connected to said interlocking means and responsive to the insertion of the rearwardly converging portion of said coupling means into said slot for inserting said locking pin through said bore and into said locking pin receiving means on the trailer.

3. An apparatus according to claim 1 wherein said means defining said forwardly diverging slot further comprises a pair of vertically-oriented guide plates mounted to the trailer so as to define a generally V-shaped slot.

4. An apparatus according to claim 3 wherein said rearwardly converging portion of said coupling means further comprises a generally horizontally-oriented rearwardly converging V-shaped member having vertical sidewalls, whereby said forward portion of said coupling means may be moved laterally, and said vertical sidewalls may be abutted with respective guide plates when said coupling means is fully inserted into said slot.

5. An improved trailer hitch of the type wherein the trailer is attached to a towing vehicle by a ball and socket mechanism, the improvement comprising:
    means rigidly secured to the front end of the trailer and defining a horizontally-oriented outwardly diverging V-shaped slot, said slot-defining means including forwardly-diverging vertically-oriented guide plates;
    a coupler loosely connected to the trailer proximate said slot and having a socket at its forward end for attachment to the ball on the towing vehicle, said coupler including a rearwardly converging member adapted for insertion into said slot on the trailer, said member having vertical sidewalls at least a portion of which have a vertical thickness substantially less than the vertical thickness of said guide plates;
    a vertically-oriented bushing secured to said coupler and defining a bore therethrough;
    a locking pin insertable through said bore; and
    locking pin receiving means rigidly secured to the trailer, said locking pin receiving means being spaced forward of the rearward extent of said slot a distance generally equal to the distance between the rearward extent of said rearwardly converging member and said bushing, whereby when said sidewalls of said member are in abutment with respective guide plates on the trailer, said locking pin may be inserted through said bore and into said locking pin receiving means to generally rigidly secure the coupler to the trailer.

6. An apparatus according to claim 5 including means intersecting said bore and supporting said locking pin above said locking pin receiving means for inserting said locking pin through said bore and into said locking pin receiving means on the trailer.

* * * * *